Sept. 11, 1928.  
E. O. EDELMANN  
1,684,128  
DEVICE FOR BRINGING AND HOLDING HEAVY WELDING PIECES IN A SUITABLE POSITION DURING THE WELDING PROCESS  
Filed Aug. 18, 1926
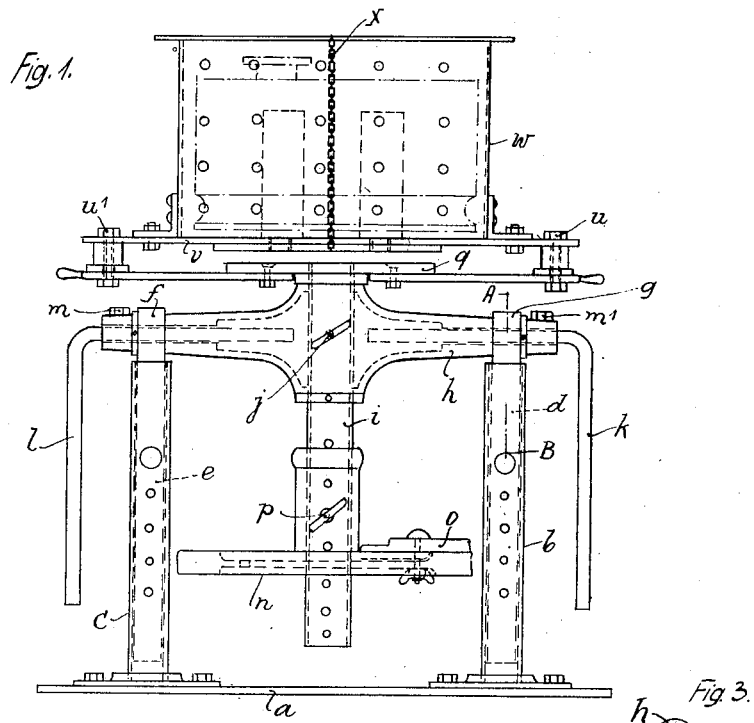
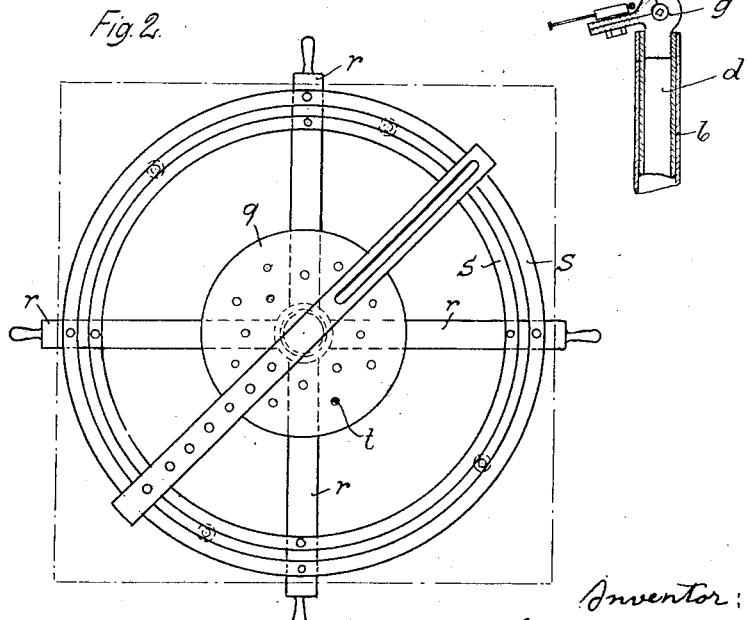

Patented Sept. 11, 1928.

1,684,128

UNITED STATES PATENT OFFICE.

EMIL OSKAR EDELMANN, OF ELBERFELD, GERMANY.

DEVICE FOR BRINGING AND HOLDING HEAVY WELDING PIECES IN A SUITABLE POSITION DURING THE WELDING PROCESS.

Application filed August 18, 1926, Serial No. 129,976, and in Germany August 20, 1925.

This invention relates to an improved device adapted to hold and bring heavy workpieces for instance heavy welding-pieces, which must be heated before welding, in any desired position during the welding-process. Hitherto, this was very difficult and only possible by means of devices, which could not be served by a single person.

According to the present invention said drawbacks are overcome and its novelty consists of a foundation-plate on which two movable hollow shafts are arranged, which cross each other and which are connected together at the crossing-point. One of said shafts rests vertically onto a fixed hollow support and is formed in its middle like a cross-piece, the ends of said cross-piece carrying exchangeable handles. Furthermore in said cross-piece a shaft is movably arranged, which shaft carries on one end a counter-weight and on the other end, projecting beyond the vertically arranged shaft, a flange with four arms and concentric rings, on which the welding-piece may be fastened.

For hollow pieces, which must be heated before working, the device is furthermore provided with a perforated plate, which can be screwed on the device and which carries supports or the like to hold the cylinder and casing, for which purpose a mantle of corresponding form is screwed on the perforated plate and adapted to receive the work-piece. After bringing the work-piece into said mantle, it is surrounded with charcoal heating the work-piece when glowing. A cover serves to close the mantle and is held thereon by a chain.

In the accompanying drawing:
Fig. 1 is a side view,
Fig. 2 a top view, and
Fig. 3 a section on the line a—b of Fig. 1.

On a foundation-plate a two hollow supports b and c are fastened. In said hollow supports tubes d and e are adjustably received, the ends of said tubes being formed as clamping-devices. The tubes d and e are movable in the hollow supports b and c, so that they can be brought in any desired height. In the ends of the tubes d and e, which are formed as clamping-devices f and g, a hollow shaft h rests and the latter is cross-like formed in its middle, to receive the rotatable shaft i, which latter can be fixed by a handle-screw j. The ends of the hollow shafts h are provided with four holes, in which right-angled curved arms k and l are fastened by means of bolts or the like m and $m^1$. The shaft i extends through the crossing-piece of the hollow shaft h carries on its lower end a counter-weight n, while on said counter-weight, comprising a heavy plate, a supporter with a clamping-device p is provided, which works like a lever, so that the counter-weight n can be moved on the shaft. On the end of the shaft i, which projects over the crossing-piece, a flange q is fastened. Said flange is provided with arms r and said arms carry concentric rings s. In the flange screws t of different kind are provided, so that small work-pieces which do not need to be heated before working, may be fastened on the device by any suitable means. In order to be able to heat the work-pieces on the device, a plate v of sheet iron may be fastened on the flange q by means of the rings s and screws u, $u^1$, on which plate a cylinder or like formed mantle w of sheet iron is provided and which is adapted to receive the work-piece. Within this mantle a motor may be placed. Within said mantle, the work-piece is surrounded with charcoal and heated through the coals, whereby tensions in the piece are prevented. A cover serves to close the mantle and is fastened and held thereon by a chain x.

The operation of the new device is as follows:

After the work-piece is brought to a suitable heating-temperature, the mantle is removed from the welding-plate. Then the welding-plate is brought to horizontal position, which is done by the flange q, on which the work-piece is fastened. In order to obtain an axial turning of the work-piece, the axle h provided with levers k and l is turned and held in this position by the clamping-device g. Essentially, the balance is hereby made by the counter-weight n movably and fixably on the shaft i. Said counter-weight n will hold the work-piece in any position, in which it is turned, without fixing the latter by the clamping-device g and the handle-screw j.

The new device may be used not only for holding welding-pieces during the welding-process, but it can also be used for any other purpose, for instance as work-plate, mounting-plate, heavy drawing-board or the like.

What I claim, is:

1. A device for the purpose described comprising a foundation plate, spaced apart hollow supports, tubular members adjustable in said supports and terminating in tubular portions forming clamping devices, a hollow shaft selectively rotatable in said clamping devices and rigid with a cross-shaped middle portion, right angled curved arms received in the ends of said hollow shaft, a vertically disposed shaft extended through said cross portion, and a counter weight carried by said last named shaft.

2. A device for the purpose described comprising a foundation plate, spaced apart hollow supports, tubular members adjustable in said supports and terminating in tubular portions forming clamping devices, a hollow shaft selectively rotatable in said clamping devices and rigid with a cross-shaped middle portion, right angled curved arms received in the ends of said hollow shaft, a vertically disposed shaft extended through said cross portion, and a counter weight carried by said last named shaft, and a flange carried by the upper end of said last named shaft.

3. A device for the purpose described comprising a foundation plate, spaced apart hollow supports, tubular members adjustable in said supports and terminating in tubular portions forming clamping devices, a hollow shaft selectively rotatable in said clamping devices and rigid with a cross-shaped middle portion, right angled curved arms received in the ends of said hollow shaft, a vertically disposed shaft extended through said cross portion, and a counter weight carried by said last named shaft and a flange carried by the upper end of said last named shaft, arms carried by said flange, and concentric rings on said arms.

4. A device for the purpose described comprising a foundation plate, spaced apart hollow supports, tubular members adjustable in said supports and terminating in tubular portions forming clamping devices, a hollow shaft selectively rotatable in said clamping devices and rigid with a cross-shaped middle portion, right angled curved arms received in the ends of said hollow shaft, a vertically disposed shaft extended through said cross portion, and a counter weight carried by said last named shaft, and a flange carried by the upper end of said last named shaft, arms carried by said flange, and concentric rings on said arms, and clamping devices co-operating with said vertically disposed shaft.

In testimony whereof I affix my signature.

EMIL OSKAR EDELMANN.